US009670986B2

(12) United States Patent
Bacon

(10) Patent No.: US 9,670,986 B2
(45) Date of Patent: Jun. 6, 2017

(54) GRIPPING ARRANGEMENT AND GRIPPING ASSEMBLY

(75) Inventor: Matthew Steven Bacon, Essex (GB)

(73) Assignee: GRIPPLE LIMITED (GB)

( * ) Notice: Subject to any disclaimer, the term of this patent is extended or adjusted under 35 U.S.C. 154(b) by 138 days.

(21) Appl. No.: 14/127,856

(22) PCT Filed: May 14, 2012

(86) PCT No.: PCT/GB2012/000429
§ 371 (c)(1),
(2), (4) Date: Dec. 19, 2013

(87) PCT Pub. No.: WO2013/007963
PCT Pub. Date: Jan. 17, 2013

(65) Prior Publication Data

US 2014/0123439 A1    May 8, 2014

(30) Foreign Application Priority Data

Jul. 8, 2011   (GB) .................................... 1111724.9
Sep. 23, 2011  (GB) .................................... 1116442.3
May 10, 2012   (GB) .................................... 1208134.5

(51) Int. Cl.
*F16G 11/10*     (2006.01)
*F16G 11/04*     (2006.01)

(52) U.S. Cl.
CPC .............. *F16G 11/04* (2013.01); *F16G 11/10* (2013.01); *F16G 11/106* (2013.01);
(Continued)

(58) Field of Classification Search
CPC ............... Y10T 24/394; Y10T 24/3944; Y10T 24/3947; Y10T 24/3936; Y10T 24/3953;
(Continued)

(56) References Cited

U.S. PATENT DOCUMENTS 1,139,595 A * 5/1915 Starr ....................... F16G 11/10
                                                      211/65
1,271,912 A * 7/1918 Kemper ................... F16G 11/10
                                                      403/384

(Continued)

FOREIGN PATENT DOCUMENTS

CN    1102815    5/1995
CN    1141877    2/1997
(Continued)

*Primary Examiner* — Robert J Sandy
*Assistant Examiner* — Matthew Sullivan
(74) *Attorney, Agent, or Firm* — Clark Hill PLC; James R. Foley

(57) ABSTRACT

A gripping arrangement (110) is disclosed for gripping an elongate article (111). The gripping arrangement comprises a body (112) defining a pathway (128) along which the article can extend and a gripping member (116) in the body for gripping the article. The gripping member is moveable from a non-gripping position to a gripping position. The gripping arrangement further includes urging means (122) to urge the gripping member towards the gripping position, and locking means (130) moveable from a non-locking position to a locking position. The locking means is configured to lock the article to the gripping member, when the locking means is in the locking position.

17 Claims, 9 Drawing Sheets

(52) U.S. Cl.
CPC ......... *F16G 11/108* (2013.01); *Y10T 24/3944* (2015.01); *Y10T 24/3951* (2015.01)

(58) Field of Classification Search
CPC ............. Y10T 24/3956; Y10T 24/3918; Y10T 24/392; Y10T 24/3969; Y10T 24/3996; Y10T 24/3993; F16G 11/10; F16G 11/04
See application file for complete search history.

(56) References Cited

U.S. PATENT DOCUMENTS

| | | | | |
|---|---|---|---|---|
| 2,226,393 A * | 12/1940 | Seeger | ................... | F16G 11/00 24/134 P |
| 2,292,746 A | 8/1942 | Donald | | |
| 3,644,966 A * | 2/1972 | Higgins | ................... | F16G 11/10 24/132 R |
| 3,793,682 A | 2/1974 | Nelson | | |
| 4,057,878 A | 11/1977 | Kaye | | |
| 4,278,042 A | 7/1981 | Lindquist | | |
| 5,070,805 A * | 12/1991 | Plante | ................... | B63B 21/08 114/199 |
| 5,147,145 A * | 9/1992 | Facey | ................... | F16G 11/04 24/136 A |
| 5,784,979 A | 7/1998 | Nelson, III | | |
| 6,003,210 A * | 12/1999 | Facey | ................... | F16G 11/04 24/130 |
| 6,546,600 B1 * | 4/2003 | Lyons | ................... | F16G 11/04 24/115 M |
| 7,111,572 B1 | 9/2006 | Yang | | |
| 7,302,740 B1 | 12/2007 | Stone et al. | | |
| 8,112,847 B2 * | 2/2012 | Shawcross | ............... | F16G 11/04 24/115 M |
| 2003/0115723 A1 * | 6/2003 | Shuey | ..................... | F16G 11/10 24/136 R |
| 2006/0196016 A1 * | 9/2006 | Cai | ......................... | F16G 11/04 24/136 R |
| 2007/0094851 A1 * | 5/2007 | Yang | ..................... | B66D 1/7415 24/115 R |
| 2007/0215411 A1 | 9/2007 | Petzl et al. | | |
| 2010/0038611 A1 * | 2/2010 | Lambourn | ............. | A01K 3/005 256/53 |
| 2011/0041292 A1 * | 2/2011 | Jolly | ...................... | F16G 11/04 24/136 R |

FOREIGN PATENT DOCUMENTS

| | | |
|---|---|---|
| CN | 2683934 | 3/2005 |
| CN | 101126434 | 2/2008 |
| GB | 2 247 926 | 3/1992 |
| GB | 2 322 408 | 8/1998 |
| GB | 2 415 012 | 12/2005 |
| GB | 2 471 773 | 1/2011 |
| JP | 64-2668 | 1/1989 |
| KR | 10-0352172 | 8/2002 |
| WO | 97/36123 A1 | 10/1997 |
| WO | 2010/019638 | 2/2010 |

\* cited by examiner

GRIPPING ARRANGEMENT AND GRIPPING ASSEMBLY

RELATED/PRIORITY APPLICATION

This application is a National Phase tiling regarding International Application No. PCT/GB2012/000429, filed on May 14, 2012, which relies upon Great Britain Application Nos. 1111724.9, 11164423 and 1208134.5, filed on Jul. 8, 2011, Sep. 23, 2011 and May 10, 2012, respectively, for priority.

This invention relates to gripping arrangements. This invention relates to gripping assemblies incorporating gripping arrangements. Embodiments of the invention relate to gripping arrangements having lockable gripping members.

In some situations, it is necessary to secure elongate articles, such as wires or wire ropes using a gripping device which comprises a moveable gripping member. The gripping member is moveable between gripping and non-gripping positions, and when the elongate article is tensioned up to the maximum load that can be withstood by the gripping arrangement, the gripping member is moved to the gripping position. However, in some circumstances, the tension in the elongate article is not at the maximum, which means that the gripping member needs to be mechanically moved to its gripping position.

According to one aspect of this invention, there is provided a gripping arrangement for gripping an elongate article, the gripping arrangement comprising a gripping member moveable from a non-gripping position to a gripping position in which the gripping member can grip the elongate article, urging means to urge the gripping member towards the gripping position, and locking means to lock the gripping member in the gripping position, the locking means being moveable from a non locking position to a locking position.

According to another aspect of this invention, there is provided a gripping arrangement for gripping an elongate article, the gripping arrangement comprising a body defining a pathway along which the article can extend, a gripping member in the body for gripping the article, the gripping member being moveable from a non-gripping position to a gripping position, urging means to urge the gripping member towards the gripping position, and locking means moveable from a non-locking position to a locking position, the locking means being configured to lock the article to the gripping member when the locking means is in the locking position.

The gripping arrangement may comprise two gripping members arranged substantially opposite each other, each gripping member being movable between the gripping and non-gripping positions. The gripping arrangement may include two urging means, each being arranged to urge a respective one of the two gripping members to its gripping position.

The locking means may comprise a locking member, which may extend transverse to the direction of movement of the gripping member.

The gripping arrangement may include a body on which the, or each, gripping member may be mounted. The, or each, gripping member may be pivotally mounted on the body.

The locking means may further include a locking formation to cooperate with the locking member. The locking formation may comprise a locking recess defined in the body in which the locking member is received when the locking member is in the locking position.

In one embodiment, the locking member may comprise a locking pin, which may extend through the gripping member.

The, or each, gripping member may be rotatably moveable from the non-gripping position to the gripping position. The, or each, gripping member may comprise a curved gripping surface for engaging the elongate article.

The, or each, urging means may comprise a spring which can resiliently urge the gripping member to the gripping position.

The, or each, gripping member may be moveable from the non-gripping position to an intermediate position in which the, or each, gripping member can engage the elongate article. In the intermediate position, the force exerted by the gripping member on the elongate article is less than the force exerted by the gripping member on the elongate article in the gripping position.

The gripping arrangement may define a path for the elongate article, and the gripping member may be moveable into said path when the gripping member moves from the non-gripping position to the gripping position.

Where the gripping arrangement comprises two gripping members, the gripping arrangement may define two paths for the elongate articles. It will be appreciated that the elongate articles gripped by the two gripping members may be separate elongate articles, or two passes of the same elongate article.

A wall may extend along the, or each, path, and the, or each, elongate article can extend adjacent to the wall. The, or each, gripping member may be configured to grip the elongate article between the wall and the gripping member.

The gripping arrangement may define an insertion opening and an exit opening for the elongate article, the insertion opening and the exit opening being arranged in communication with the path. Where the gripping arrangement comprises two gripping members, the gripping arrangement may define two insertion openings and two exit openings for the, or each, elongate article.

The gripping arrangement may further include a force applying means for applying a force to the, or each, gripping member to move the gripping member from the non-gripping position to the gripping position. The force applying means may comprise a lever, which may be separate from the gripping arrangement. Alternatively, the force applying means may comprise a force applying portion, which may be integrally provided on the gripping member.

In another embodiment, the locking means may comprise a rotatable locking member, which may be rotatable from the non-locking position to the locking position.

The gripping arrangement may include a body, which may define an aperture for receiving the locking member. The locking member may be rotatably mounted on the body.

First holding formations may be provided on the locking member. Second holding formations may be provided on the body. The first holding formations may cooperate with the second holding formations when the locking member is in the non-locking position, thereby to hold the locking member in the non-locking position.

Two first holding formations may be provided on the locking member, opposite one another. Two second holding formations may be provided in an opposed relationship on the body. The aperture may be defined between the two opposed second holding formations.

First locking formations may be provided on the locking member. Second locking formations may be provided on the body. The first locking formations may be provided opposite each other on the locking member. The first locking formations may cooperate with the second locking formations when the locking member is in the locking position, thereby to lock the locking member in the locking position.

Two first locking formations may be provided opposite each other on the locking member. Two second locking formations may be provided in an opposed relationship on the body. The aperture may be defined between the two opposed second holding formations.

The locking member may comprise a head and a cam member. The first holding formations may be provided on the cam member. The first locking formations may be provided on the head.

The body may define a pathway for an elongate article. The cam member may comprise a substantially flat surface for alignment with the pathway when the locking member is in the non-locking position. The locking member may comprise two substantially flat surfaces opposite each other on the cam member.

The locking member may comprise a cam surface on the cam member, which may be in the form of a convexly curved cam surface. The cam surface may be configured to extend into the pathway when the locking member is in the locking position. The locking member may comprise two of the aforesaid cam surfaces arranged opposite each other on the cam member. When the locking member is in the locking position, the two cam surfaces may extend into the respective pathways, thereby engaging the elongate article to clamp the elongate article securely.

According to another aspect of this invention, there is provided a gripping assembly comprising first and second gripping arrangements described above for gripping two elongate articles, or first and second passes of the same elongate article.

Embodiments of the invention will now be described by way of example only, with reference to the accompanying drawings, in which.

Figure 1:
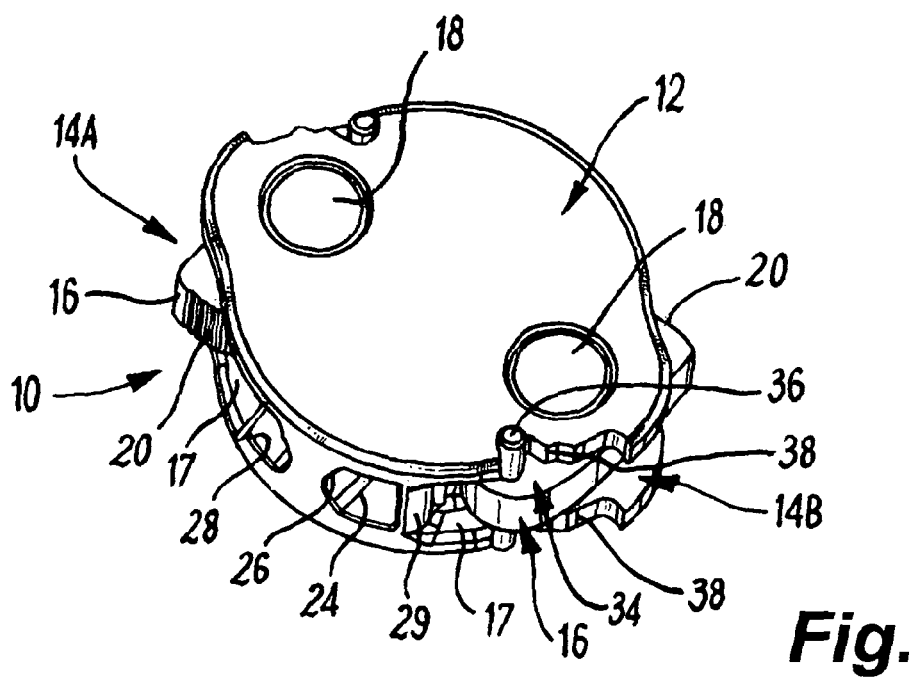
FIG. 1 is a perspective view of a gripping assembly having first and second gripping arrangements, with the gripping member of each gripping arrangement in a non-gripping position.
Figure 2:
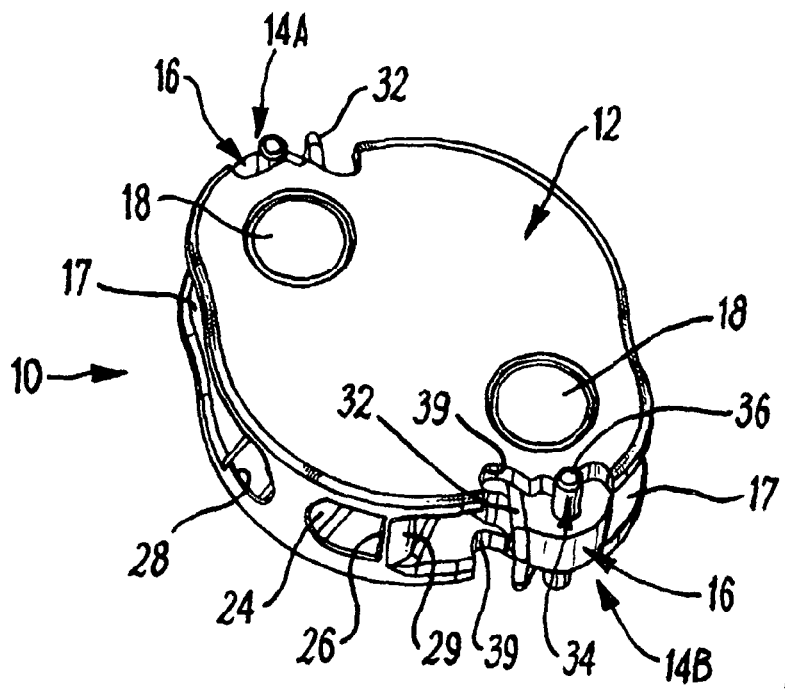
FIG. 2 is a view similar to FIG. 1, with the gripping member of each gripping arrangement in a gripping position.

FIGS. 1 to 7 of the drawings show a first embodiment of a gripping assembly 10 comprising a body 12 and first and second gripping arrangements 14A, 14B mounted in the body 12. Each gripping arrangement 14A, 14B comprises a gripping member 16.

The body 12 defines two cavities 17 in which the gripping members 16 of respective gripping arrangements 14A, 14B are received. Each gripping member 16 is pivotally mounted by a pivot 18 on the body 12.

Each gripping member 16 has a convexly curved surface 20 for engaging an elongate article 22 (shown in broken lines in FIGS. 6 and 7), such as a wire or a wire rope. Each gripping member 16 is pivotally moveable about the pivot 18 between a non-gripping position shown in FIGS. 1, 3 and 6, and a gripping position shown in FIGS. 2, 4 and 7.

Each gripping arrangement 14A, 14B further includes a pathway 24 defined in the body through which first and second elongate articles 22, or first and second passes of the same elongate article 22, can extend.

Each gripping arrangement 14A, 14B further includes an insertion opening 26 defined in the body 12, and an exit opening 28, also defined in the body 12. The pathway 24 extends between the insertion and exit openings 26, 28, which provide communication between the region external of the gripping assembly 10 and each pathway 24. The body 12 includes respective web portions 29 between each insertion opening 26 and the respective cavity 17 adjacent thereto.

The elongate article 22 can be inserted into the pathway 24 via the insertion opening 26, and can exit from the pathway 24 via the exit opening 28.

The gripping arrangements 14A, 14B are arranged adjacent each other in the body 12, with the insertion opening 26 of each of the gripping arrangements 14A, 14B being arranged adjacent the exit opening 28 of the other of the gripping arrangements 14A, 14B. The pathways 24 of each gripping arrangement 14A, 14B are arranged adjacent one another. The body 12 includes a wall 30 between the pathways 24 of each gripping arrangement 14A, 14B, separating them from each other.

Each gripping arrangement 14A, 14B further includes a resilient urging means in the form of a spring 32 to urge the gripping member 16 from the non-gripping position to the gripping position.

In use, two elongate articles 22, or two passes of the same elongate article 22 are inserted into the pathway 24 of the respective gripping arrangements 14A, 14B via the insertion opening 26 in the direction indicated by the arrow A. This insertion of the elongate article 22 moves the gripping member 16 to the non-gripping position, thereby allowing the elongate article 22 to be easily moved through the pathway 24 in the direction indicated by the arrow A.

The inserted end of the elongate article 22 exits from the gripping assembly 10 via the exit opening 28. The elongate article 22 is continued to be so inserted, until the desired length of the elongate article 22 has been inserted therethrough.

The spring 32 urges the gripping member 16 onto the elongate article 22. Movement of the elongate article 22 in the direction indicated by the arrow B, i.e. opposite to that indicated by the arrow A, causes the gripping member 16 to be rotated in the direction indicated by the arrow C so that the curved surface 20 of the gripping member 16 is urged into gripping engagement with the elongate article 22.

Further movement of the elongate article in the direction indicated by the arrow B urges the curved surface 20 into tighter gripping engagement with the elongate article 22, so that the elongate article is securely gripped by the elongate article 22.

Figure 3:
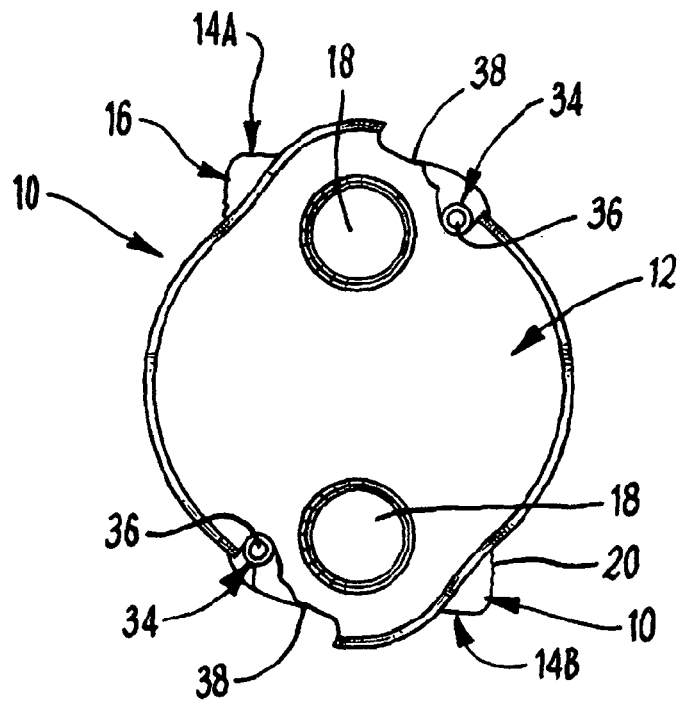
FIG. 3 is a top view of the gripping assembly shown in FIG. 1, with the gripping member of each gripping arrangement in the non-gripping position.
Figure 4:
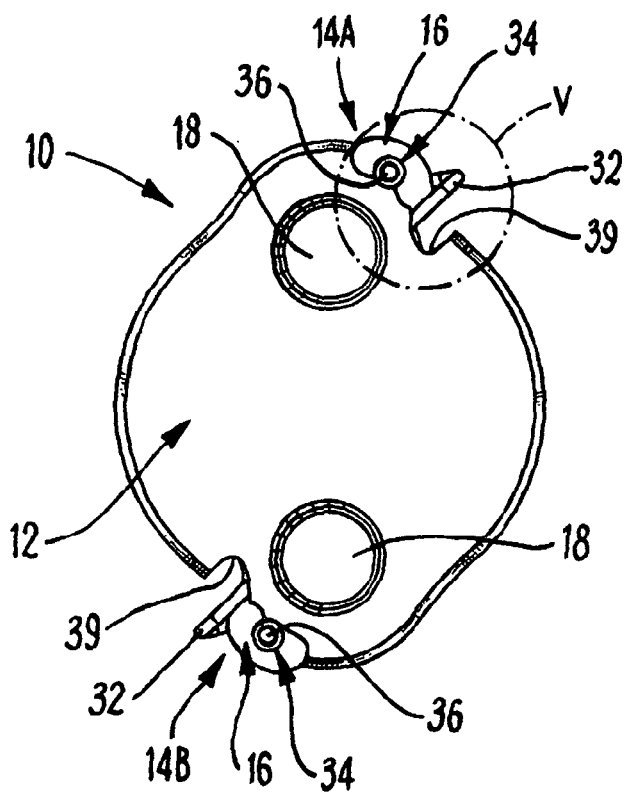
FIG. 4 is a view similar to FIG. 3, with the gripping member of each gripping arrangement in the gripping position.
Figure 6:
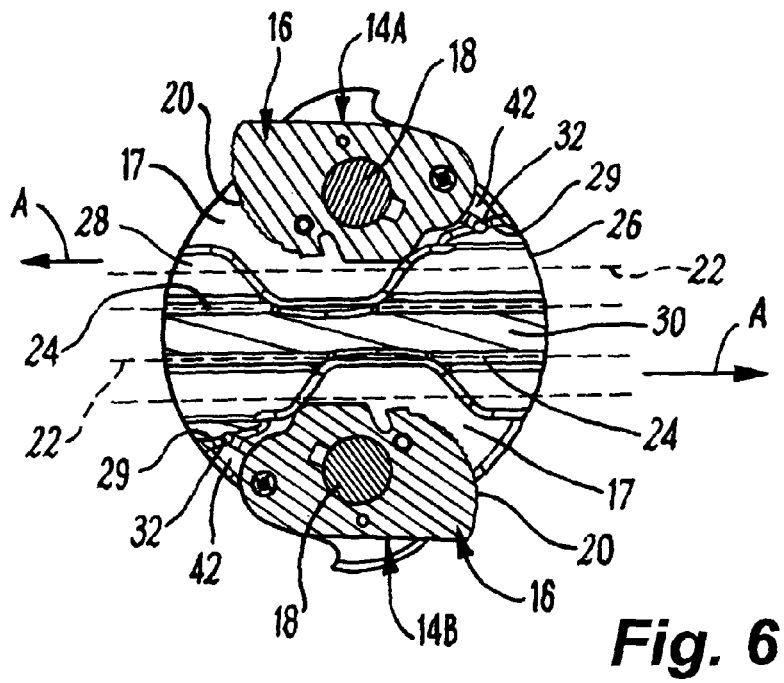
FIG. 6 is a top sectional view of the gripping arrangement shown in FIG. 1, with the gripping member of each gripping assembly in the non-gripping position.
Figure 7:
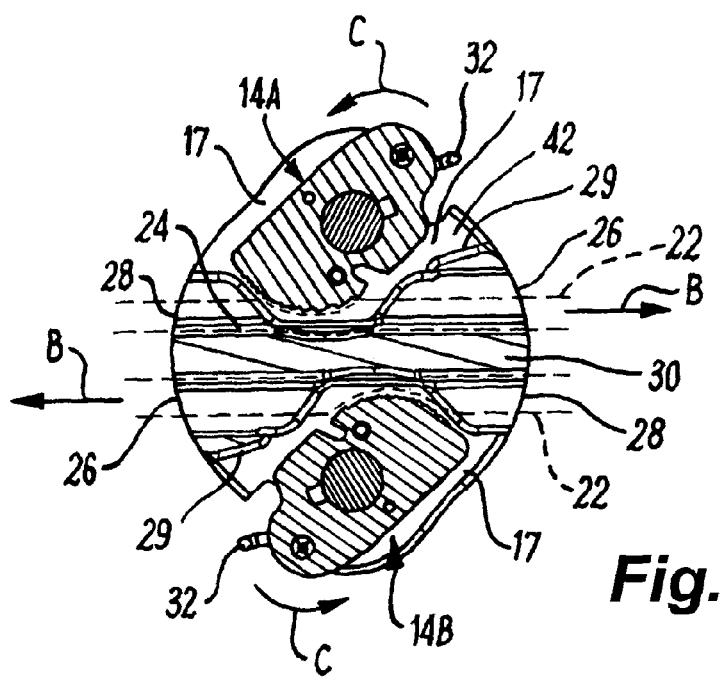
FIG. 7 is a view similar to FIG. 6, with the gripping member of each gripping arrangement in the gripping position.

If enough force is applied to the elongate article 22 in the direction indicated by the arrow B, the gripping member 16 is moved by the movement of the elongate article 22 to the gripping position shown in FIGS. 1, 3 and 6. In the gripping position, the gripping member 16 applies the maximum possible load to the elongate article 22.

However, in many circumstances, the force applied to the elongate article 22 is not sufficient to move the gripping member 16 to the gripping position, which means that the maximum load is not applied by the gripping member 16 to the elongate article 22. Where the gripping assembly 10 is used in dynamic conditions, this can cause problems, in that the elongate article 22 may become released from the gripping assembly 10. In order to avoid this problem, each of the gripping arrangements 14A, 14B comprises locking means 34

In the embodiment described herein, the locking means 34 comprises a locking pin 36 and opposed locking formations in the form of locking recesses 38 defined in the body 12 on opposite sides of the gripping member 16. The locking pin 36 extends through the gripping member 16 and is received in opposed locking recesses 38 when the gripping member 16 is in the gripping position The body 12 also defines opposed non-locking recesses 39, in which the locking pin 36 is received when the gripping member 16 is in the non-gripping position.

When the elongate article 22 is inserted to the desired extent into the pathway 24, the gripping member 16 can be manually moved to the gripping position by the use of a force applying member in the form of a lever 40. The lever 40 can be inserted into a gap 42 between the gripping member 16 and the web portion 29 (see FIGS. 4 and 5).

Figure 5:
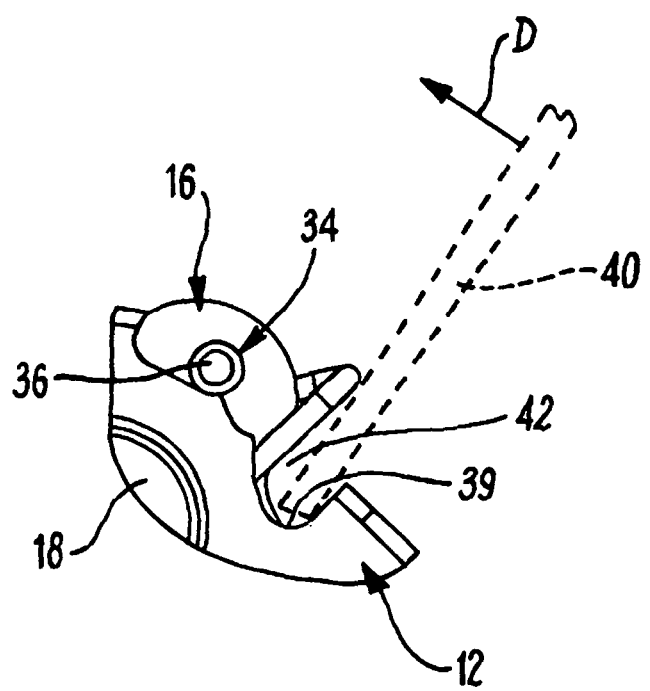
FIG. 5 is a close up view of the region marked V in FIG. 4.

A force can then be applied to the gripping member 16 in the direction indicated by the arrow D (see FIG. 5). This moves the gripping member 16 to the gripping position and causes the locking pin 36 to be moved from the non-locking recesses 39 to the locking recesses 38. When the locking pin 36 is received in the locking recesses 38, the gripping member 16 is in the gripping position and the maximum load is applied by the gripping member 16 to the elongate article 22.

There is thus described a gripping assembly 10 comprising first and second gripping arrangements 14A, 14B, each having a rotatable gripping member 16 having a curved surface 20. The gripping member 16 can be moved by a force applying lever 40 to the gripping position to securely grip the elongate article 22.

Various modifications can be made without departing from the scope of the invention. For example, the force applying member could be a force applying portion on the gripping member 16.

FIGS. 8 to 15 of the drawings show a second embodiment of a gripping assembly 110 for gripping first and second elongate articles 111 or first and second passes of the same elongate article 111. The gripping assembly 110 comprises a body 112 having a front side wall 112A and a rear side wall 112B.

The gripping assembly 110 further includes first and second gripping arrangements 114A, 114B. Each gripping arrangement 114A, or 114B comprises a respective gripping member mounted in a passage 118 defined in the body 112 adjacent a first wall 119.

Figure 8:
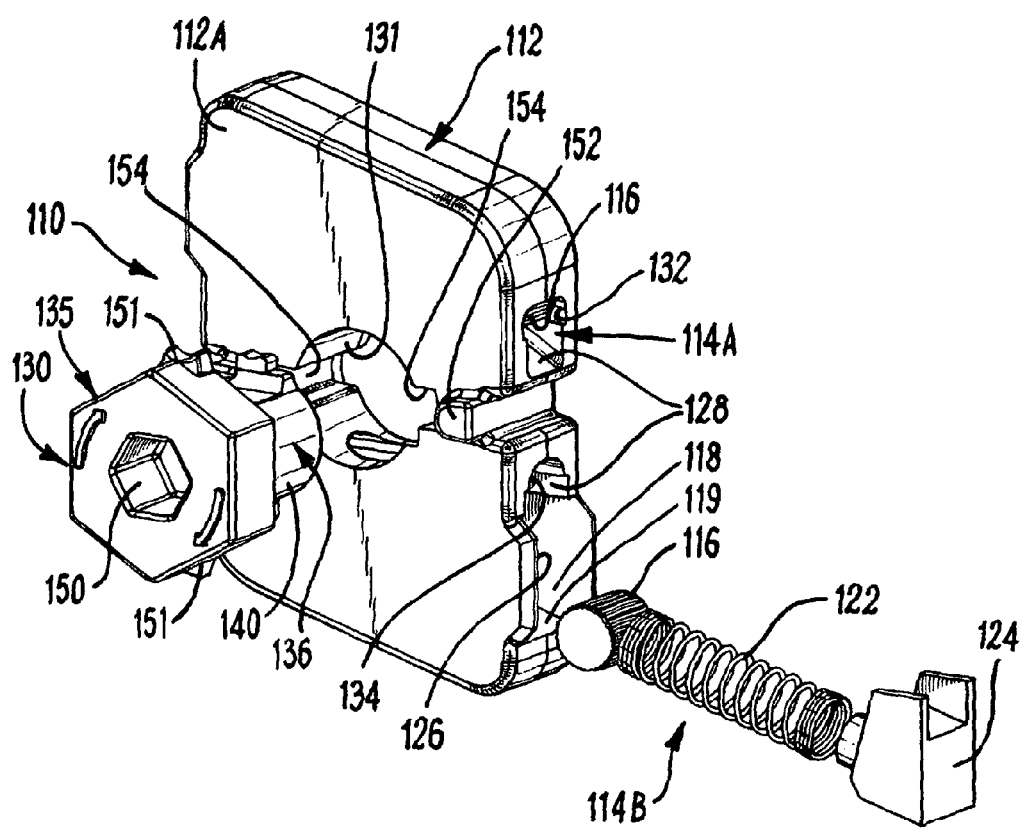
FIG. 8 is a partially exploded view of a second embodiment of a gripping assembly.

Each gripping arrangement 114A, 114B further includes a gripping member 116, a resilient urging member in the form of a compression spring 122, and a reaction member 124. In FIG. 8, the gripping arrangement 114B is shown in an exploded condition, with the gripping member 116, the spring 122 and the reaction member 124 are shown removed from the body 112 so that they can be seen in more detail.

The body 112 defines two access openings 126 providing access to the passages 118. Each gripping member 116, each compression spring 122 and each reaction member 124 are received within a respective passage 118, with the reaction members 124 being secured at the openings 126 by, for example, friction.

The reaction members 124 provide a reaction force on the compression spring so that the compression spring 122 urges the gripping member 116 along the passage 118 in the direction indicated by the arrow C.

Figure 10:
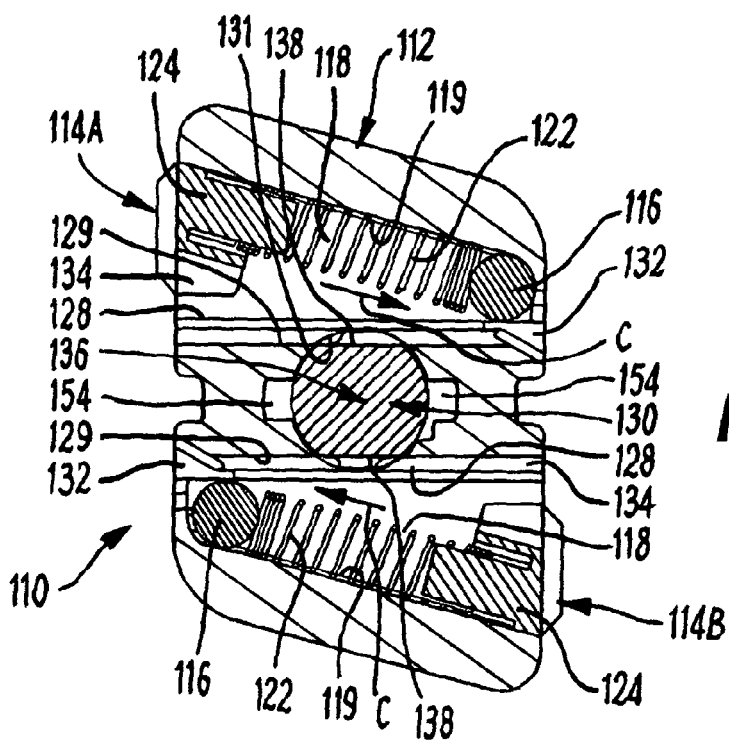
FIG. 10 is a sectional side view of the second embodiment of the gripping assembly with the locking means in the non-locking position.
Figure 12:
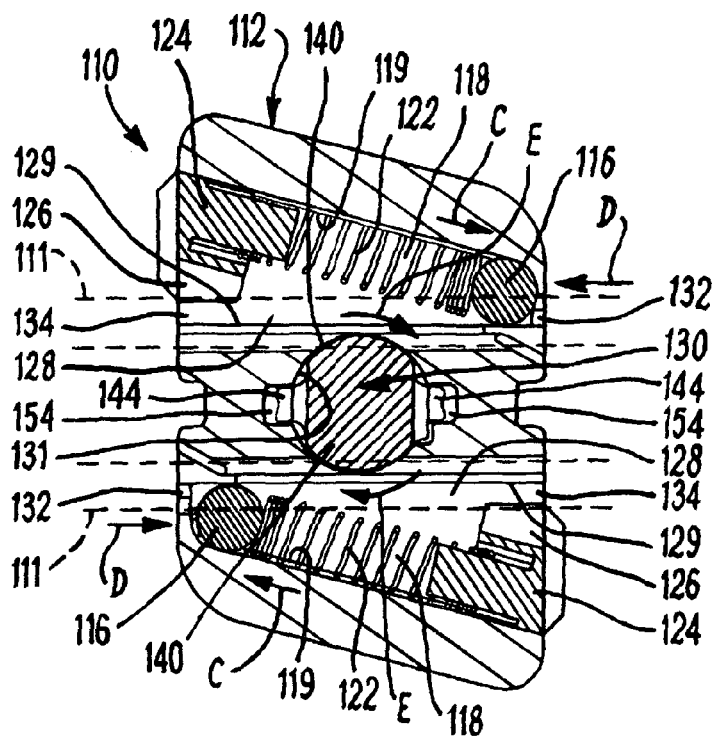
FIG. 12 is a sectional side view of the second embodiment of the gripping assembly with the locking means in the locking position.

Each gripping arrangement 114A, 114B further includes a pathway 128 defined in the body 112 adjacent a second wall 129. As can be seen in FIGS. 10 and 12, the first wall 119 of each passage 118 extends relative to the second wall 129 of the respective pathway 128 at an acute angle of roughly 30°. An insertion opening 132 and an exit opening 134 are defined in the body 112 for each pathway 128 so that each pathway 128 extends between the insertion and exit openings 132, 134.

An end region of an elongate article 111 can be inserted into one of the pathways 128 via the respective insertion opening 132, and can exit therefrom via the respective exit opening 134. A further elongate article 111, or a second pass of the previously mentioned elongate article 111, can then be inserted into the pathway 128 of the other of the gripping arrangement 114A, 114B, in the same way.

When the elongate article is threaded through the pathway 128 in the direction indicated by the arrow D, the elongate article 111 pushes the gripping member 116 against the urging of the spring 122, thereby moving the gripping member 116 away from the second wall 129.

The elongate article 111 can then continue to be threaded through the pathway 128 in the direction indicated by the arrow D in FIG. 12 until the desired length of the elongate article 111 has been threaded through the pathway 128.

In order for the first and second passes of the elongate article 111 to be secured by the first and second gripping arrangement 114A, 114B the elongate article 111 can then be moved along the pathways 128 in the direction opposite to that indicated by the arrow D in FIG. 12.

The gripping members 116 of the respective gripping arrangements 114A, 114B are urged by the springs 122 and the first walls 119 into tighter engagement with the elongate article 111, thereby clamping the elongate article 111 between the gripping members 116 and the second walls 129.

Continued movement of the elongate article 111 in the direction opposite to that indicated by the arrow D tightens the gripping member 116 against the elongate article, thereby securing the elongate article 116 in the pathway 128, up to a maximum clamping force.

The clamping assembly further includes a locking member 130 which is mounted on the body 112 in an aperture 131, defined centrally through the body 112. The aperture 131 extends through the body 112 from one side to the opposite side.

Figure 14:
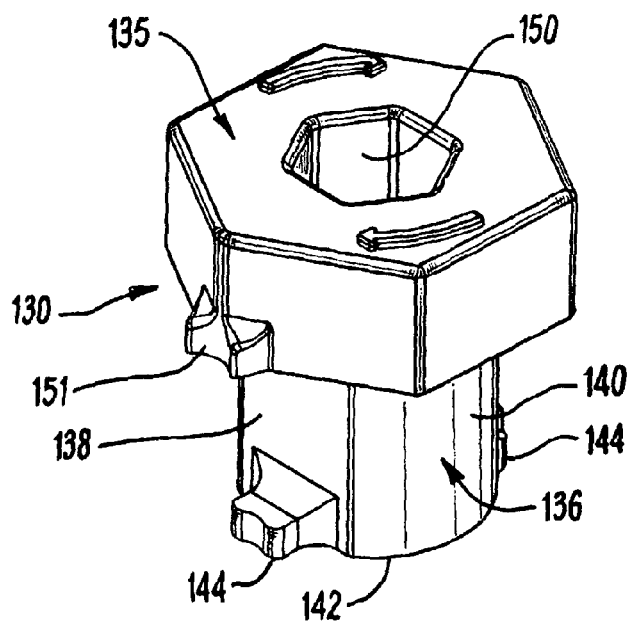
FIG. 14 is a perspective view of a locking member.
Figure 15:
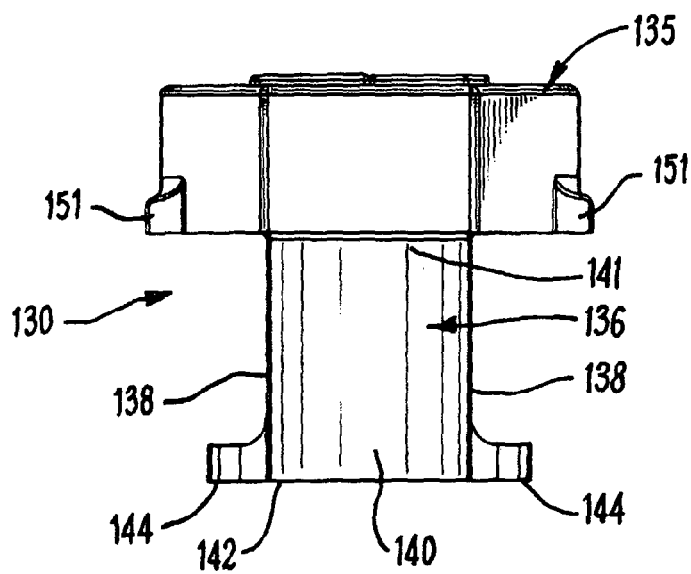
FIG. 15 is a side view of the locking member.

The locking member 130 is shown more clearly in FIGS. 14 and 15 and comprises a head 135 and a cam member 136. The cam member 136 defines two opposite substantially flat faces 138 and two opposite cam surfaces 140, which are arranged alternately on the cam member 136. The cam surfaces 140 are convexly curved surfaces.

The cam member 136 has a proximal end 141 at which the cam member 136 is connected to the head 135. The cam member 136 also has a distal end 142 opposite the proximal end 141. Two first holding projections 144 are provided opposite each other, at the distal end 142. Each first holding projection 144 is provided on a respective one of the flat faces 138 at the distal end 142 of the cam member 136.

Figure 13:
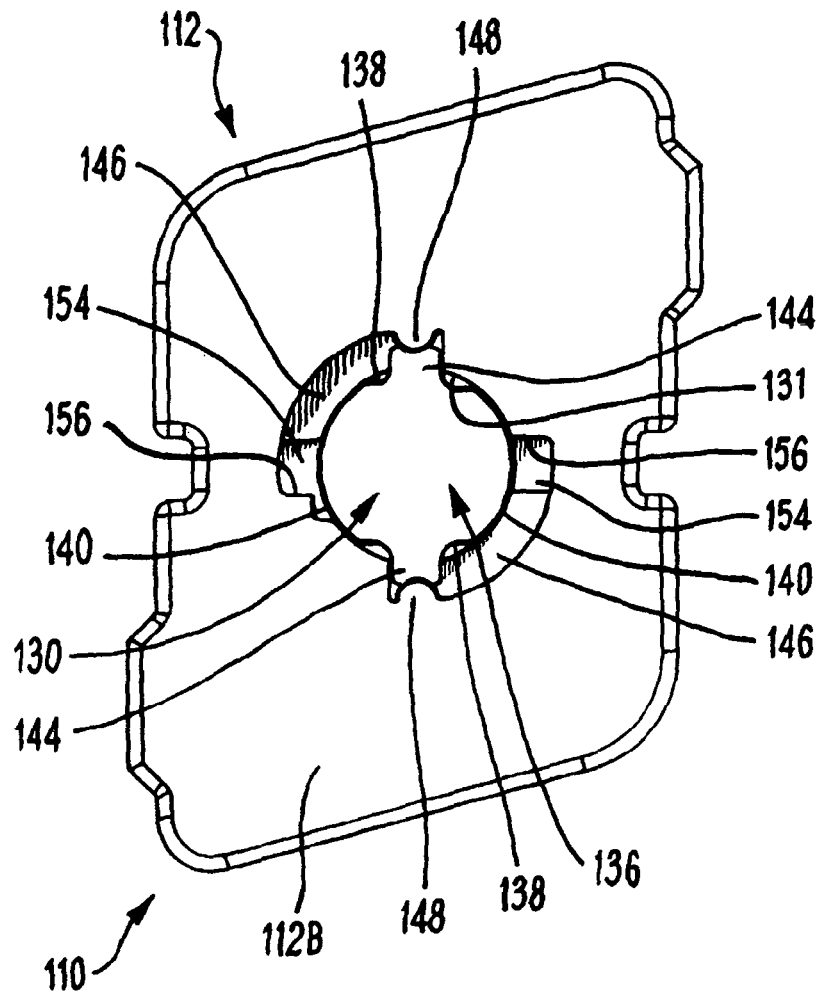
FIG. 13 is a view of a second side of the gripping assembly.

Referring to FIG. 13, the body 112 includes two arced track formations 146 which are recessed relative to the rear wall 112B of the body 112. The track formations 146 extend around the aperture 131 adjacent the rear wall 112B.

Referring to FIG. 13, the first holding projections 144 are arranged diametrically opposite each other on the cam member 136 and are configured to move across a respective one of the arced track formations, when the locking member 130 is moved from a non-locking position to a locking position, as explained below.

The body 112 includes opposed second holding formations 148 extending over the track formations 146. The second holding formations 148 are arranged to cooperate with the first holding formations 144 when the locking member 130 is in the non-locking position, thereby holding the locking member 130 in the non-locking position, as shown in FIG. 13.

The head 135 extends radially outwardly beyond the cam member 136 and is of a hexagonal or octagonal profile to allow the locking member 130 to be turned by a spanner. The head 135 defines a hexagonal recess 150 to receive an end region of a hexagonally profiled key, such as an allen key. Thus, the user can easily turn the locking member from the non-locking position to the locking position by the use of a spanner or a hexagonal key.

A pair of first locking projections 151 are provided opposite each other on the head 135. A pair of opposed second locking projections are provided on the body 112 opposite each other, with the aperture 131 therebetween.

The first locking projections 151 can cooperate with the second locking projections 152 when the locking member 130 is in the locking position, thereby locking the locking member 130 in the locking position. The second locking projections 152 are provided opposite each other on the body 112, with the aperture 131 defined between the second locking projections 152.

The body 112 defines two channels 154 opposite each other in communication with the aperture 131. The channels 154 extend through the body from the front wall 112A to the rear wall 112B.

The locking member 130 can be mounted on the body 112 by insertion of the cam member 136 into the aperture 131. The first holding projections 144 are received by, and pass through, the channel 154 when the cam member 136 is inserted into the aperture 131.

An abutment 156 is provided at the end of each channel 154, extending inwardly from the rear wall 112B. When the locking member 130 is in the locking position, each of the first holding formations 144 abuts against a respective one of the abutments 156. Thus, the locking member 130 can be moved to the locking position, but is prevented from moving beyond the locking position by the engagement of the holding formations 144 with the abutments 156.

When the locking member 130 is in the locking position, the cam surfaces 140 extend into the respective pathways 128 thereby engaging the elongate article 111 therein to increase the clamping force thereon.

In order to secure an elongate article 111 to the gripping assembly 110, the locking member 130 is first disposed in the non-locking position. A first pass of the elongate article 111 is inserted through the first gripping arrangement 114A, and a second pass of the elongate article is inserted through the second gripping arrangement 114B, both in the direction of the arrow C.

The first and second passes of the elongate article 111 are then moved slightly in the direction opposite to the direction indicated by the arrow C, to effect clamping thereon by the gripping members 116.

Figure 9:
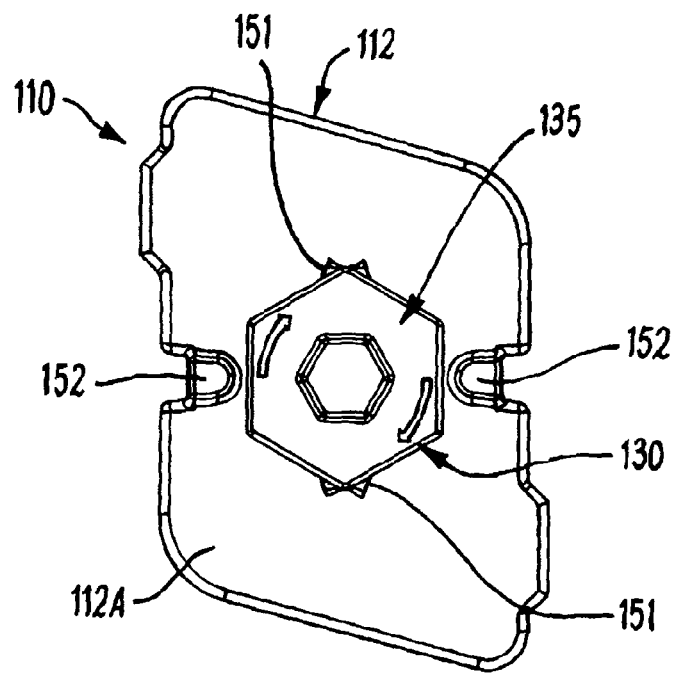
FIG. 9 is a view of a first side of the second embodiment of the gripping assembly with a locking means in a non-locking position.
Figure 11:
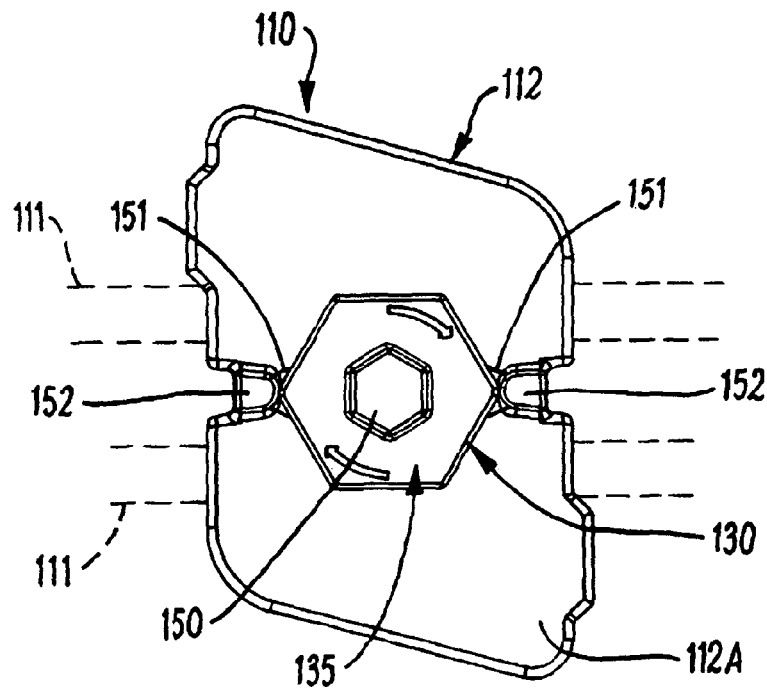
FIG. 11 is a view of a first side of the second embodiment of the gripping assembly with the locking means in a locking position.

In order to secure the elongate article more tightly to the gripping assembly 110, the locking member 130 is rotated by the use of a spanner or a hex key so that the locking member 130 rotates in the direction indicated by the arrows E in FIG. 12, from the non-locking position, shown in FIGS. 9 and 10, to the locking position, shown in FIGS. 11 and 12.

When the locking member 130 is in the locking position, the convexly curved cam surfaces 140 of the cam member 136 extend into the pathways 128, to engage and increase the clamping force on the elongate article 111.

In addition, the rotation of the locking member 130 in the direction indicated by the arrows E has the effect of urging the elongate article 111 and the gripping members 116 generally in the direction indicated by the respective arrows C. This increases the clamping force on the elongate article 111 by the gripping members 116.

If it is desired to move the elongate article 111 in the gripping assembly 110, it is necessary to release the elongate article 111 from being clamped by the clamping arrangements 114A, 114B. This is accomplished by rotating the locking member 130 from the locking position to the non-locking position.

When the locking member 130 is in the non-locking position, the substantially flat faces 138 are aligned with the second walls 129, as shown in FIG. 10. Thus, the clamping force applied to the elongate article 111 by the gripping member 116 is reduced, and the elongate article 111 can be moved in the direction opposite to that indicated by the arrow C in the respective pathway 128.

The substantially flat faces 138 and the cam surfaces 140 constitute alternative wall portions against which the elongate article 111 can be clamped by the gripping members 116. While not wishing to be limited to any particular theory, it is believed that the elongate article 111 is held in the pathway 128 by friction between the moveable gripping member 116 and the wall portion against which the elongate article 111 is clamped.

The rotatable locking member 130 provides what are, in effect, selectable wall portions. Thus, when the gripping member 116 is in the locking position, the cam surfaces 140 provide convexly curved wall portions that extend into the pathways 128, protruding from the second wall 129. Whereas, when the gripping member is in the non-locking position, the substantially flat faces 138 provide substantially flat wall portions that are substantially coplanar with the second wall 129.

In the locking position, the friction forces between the article 111 and the wall portions provided by the convexly curved cam surfaces 140 are greater than the friction forces in the non-locking position, between the article 111 and wall portions provided by the substantially flat faces 138. As a result, the article 111 is held more tightly when the locking member 130 is in the locking position than when it is in the non-locking position.

The invention claimed is:

1. A gripping arrangement for gripping an elongate article, the gripping arrangement comprising a body having opposed tapering walls, a gripping member in the body for gripping the article between the tapering walls, the gripping member being moveable from a non-gripping position to a gripping position, urging means to urge the gripping member towards the gripping position; and a cam member moveable from a non-locking position to a locking position; wherein the cam member has a cam surface to engage the elongate article and to apply a force against the elongate article to grip the elongate article between the cam surface and the gripping member, thereby locking the article to the gripping member when the cam member is in the locking position; wherein the body defines a pathway along which the article can extend, the pathway extending between the gripping member and the cam member, wherein the cam surface extends into the pathway when the cam member is in the locking position, and wherein the cam member comprises a substantially flat surface extending coplanar with one of the walls when the cam member is in the non-locking position.

2. A gripping arrangement according to claim 1, wherein the cam member comprises a substantially flat surface for alignment with the pathway when the cam member is in the non-locking position.

3. A gripping arrangement according to claim 2, wherein the substantially flat surface constitutes a second wall portion for engaging the article.

4. A gripping arrangement according to claim 1, comprising two gripping members and two urging means, wherein the cam member comprises two cam surfaces, each cam surface being configured to engage the elongate article gripped by the respective gripping member.

5. A gripping arrangement according to claim 4, wherein both gripping members and both urging means are mounted in the body, and wherein the body defines two pathways for at least one elongate article, and the cam member comprises two substantially flat surfaces, each flat surface being arranged for alignment with a respective one of the pathways when the cam member is in the non-locking position.

6. A gripping arrangement according to claim 5, wherein the two substantially flat surfaces are substantially opposite each other on the cam member.

7. A gripping arrangement according to claim 4, wherein both gripping members and both urging means are mounted in the body, the body defining two pathways for at least one elongate article, and each cam surface is arranged to extend into a respective one of the pathways when the cam member is in the locking position.

8. A gripping arrangement according to claim 5, wherein the gripping members and the urging means are disposed substantially opposite each other in the body, and wherein the cam surfaces are disposed substantially opposite each other on the cam member.

9. A gripping arrangement according to claim 4, wherein each cam surface is configured to extend into a respective one of the pathways when the cam member is in the locking position, thereby allowing each cam surface to engage the elongate article in the respective pathway.

10. A gripping arrangement according to claim 1, wherein the body defines a central aperture for receiving the cam member.

11. A gripping arrangement according to claim 10, wherein the cam member includes a head on the cam member, the cam member being received in the aperture.

12. A gripping arrangement according to claim 11, wherein first holding formations are provided on the cam member, and second holding formations are provided on the body, the first holding formations cooperating with the second holding formations when the cam member is in the non-locking position, thereby to hold the cam member in the non-locking position.

13. A gripping arrangement according to claim 12, wherein two first holding formations are provided opposite each other on the cam member, and two second holding formations are provided in an opposed relationship on the body, the aperture being defined between the two opposed second holding formations.

14. A gripping arrangement according to claim 12, wherein first locking formations are provided on the cam member, and second locking formations are provided on the body, the first locking formations cooperating with the second locking formations when the cam member is in the locking position, thereby to lock the cam member in the locking position.

15. A gripping arrangement according to claim 14, wherein two first locking formations are provided opposite each other on the cam member, and two second locking formations are provided in an opposed relationship on the body, the aperture being defined between the two opposed second holding formations.

16. A gripping arrangement according to claim 14, wherein the first holding formations may be provided on the cam member, and the first locking formations are provided on the head.

17. A gripping arrangement according to claim 1, wherein the, or each, gripping member is linearly moveable from the non-gripping position to the gripping position.

* * * * *